UNITED STATES PATENT OFFICE.

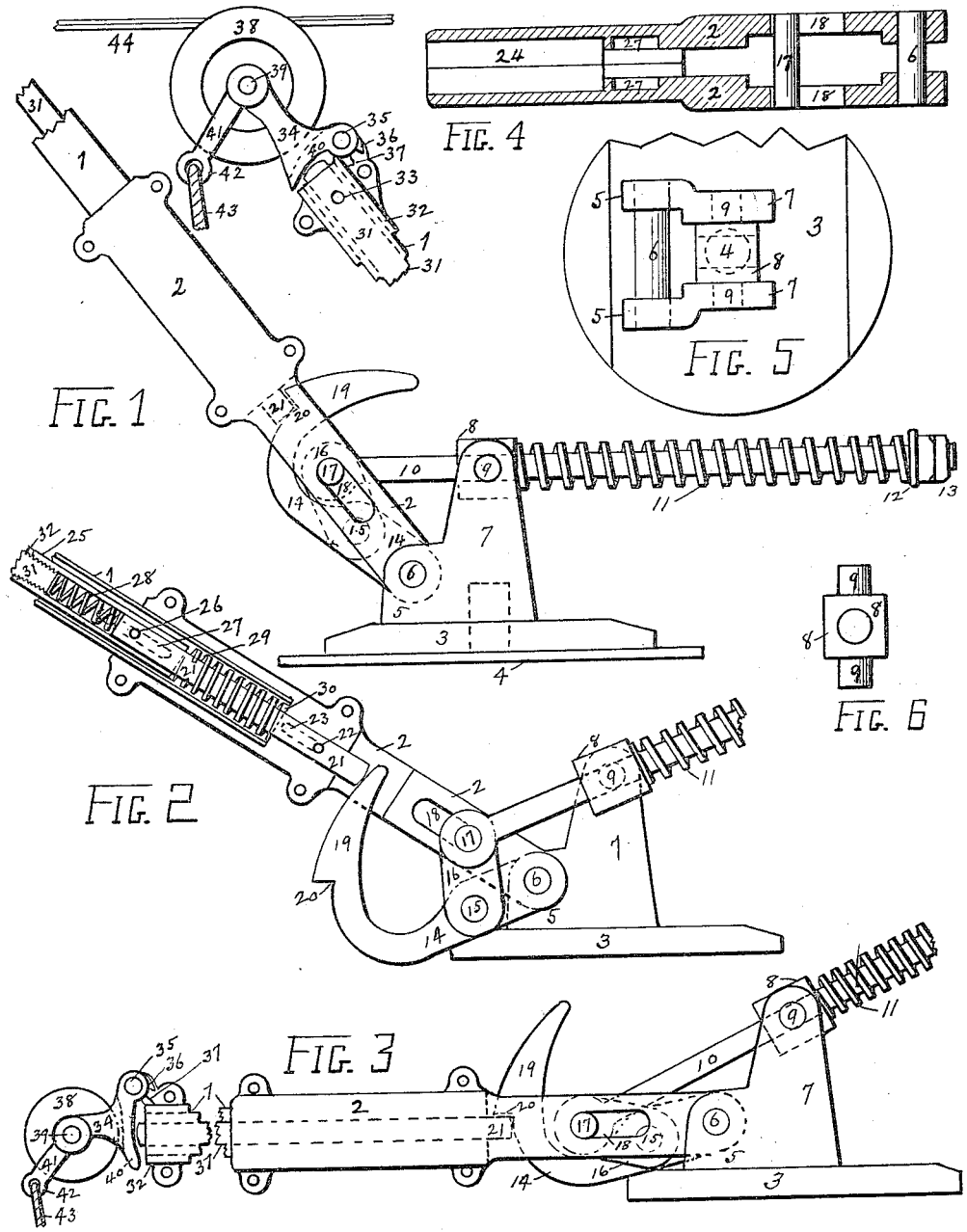

EDWARD ALBERT COLTON, OF GALESBURG, ILLINOIS.

TROLLEY-POLE-CONTROLLING DEVICE.

1,212,326.  Specification of Letters Patent.  Patented Jan. 16, 1917.

Application filed May 14, 1915. Serial No. 28,028.

*To all whom it may concern:*

Be it known that I, EDWARD ALBERT COLTON, residing at Galesburg, in the county of Knox and State of Illinois, have invented certain new and useful Improvements in Trolley-Pole-Controlling Devices, of which the following is a specification.

This invention relates to means for controlling the trolley poles of electric railway cars and consists of mechanism arranged to lower the trolley pole instantly from its operative elevation whenever the trolley wheel becomes disengaged from its proper relation to the overhead power-supplying wire.

I am aware that many patents have been granted on devices for dropping or pulling down the trolley pole when the trolley wheel flies off the wire, but in most of these the dropping or retrieving action is produced by and does not take place until after a violent upward and forward movement of the trolley pole. By my device this upward and forward stroke of the escaped trolley is entirely prevented and the consequent risk of breakage or injury of wires or trolley is eliminated. In such patents as have had a similar object, the means used have been too cumbersome, too unreliable or too short-lived and none of them, so far as I am informed, has been found really practicable.

I am aware that means somewhat similar to parts of my device are shown in some of the patents granted, but, as will be shown later, my invention consists in the improved manner of using said means and in their co-action with means not heretofore used.

Having defined the purpose and nature of my invention, the particular means used will now be described and the manner of their operation will be described, it being understood that the parts and relation of parts set forth herein present only one way of producing the desired result and that any other parts or relation of parts producing the same results would not be a departure from the spirit and advantages of my invention.

In the accompanying drawings, Figure 1 shows a trolley pole and attachments, embodying my invention, in operative position, part of the pole being broken away. Fig. 2 shows the same after being allowed to drop by the action of my device, the parts being shown in vertical section. Fig. 3 shows the manner of restoring the trolley pole and its erector-spring to their operative relation. Fig. 4 is a longitudinal sectional view of the trolley pole yoke through the axle of the hinge pin, Fig. 5 shows a top view of the revoluble trolley base, and Fig. 6 shows the trunnioned washer used for mounting the erector spring and its connecting rod.

Each part is given the same numerical designation in all of the drawings.

A trolley pole 1 is clamped in a specially constructed yoke 2, pivotally attached to its revoluble base 3, mounted on a pivot plate 4, on the top of a vehicle. The base casting 3 is provided with suitable lugs 5 for attaching trolley yoke 2 by means of hinge pin 6. It also has posts 7, with provision for receiving trunnions 9 of trunnion washer 8. The position of lugs 5 and posts 7 on base plate 3 is shown in Fig. 5. A connecting rod 10, attached to trolley yoke 2 as explained later, is slidably mounted in washer 8, preferably with the axes of 8 and 10 intersecting each other at right angles. Washer 8 is shown clearly in Fig. 6. A compression spring 11 is placed on rod 10, between washer 8 and washer 12, and adjusted to the desired tension by means of lock-nuts 13.

A link 14 is placed between the forks of yoke 2, hinge pin 6 passing through one end of said link 14, the forks and other details of yoke 2 being shown in Fig. 4.

Trunnions 15 are provided, projecting laterally from link 14 and upon these trunnions are mounted the lower ends of links 16, whose upper ends are placed between the forks of yoke 2, and is shiftably attached to said yoke by pin 17, which extends through links 16 into slotted openings 18 in the forks of yoke 2. Space is provided between the upper ends of said links 16 for the head of connecting rod 10. Pin 17 passes through an eye in the head of said rod 10, thus attaching rod 10 to yoke 2 and giving it a shiftable connection therewith as later explained. These parts are so constructed and assembled that the axis of shiftable pin 17 is always held parallel to the axis of hinge pin 6 and the shiftability of said pin 17 is limited and defined by slots 18 of yoke 2, the lines of the longitudinal diameters of said slots 18 being preferably at right angles with the axes of pins 6 and 17 and lying in the same plane with each other and with said axes.

Link 14 is extended backward in a hook-shaped curve 19, with a ratchet tooth 20 on its outer edge. Hook 19 always lies loosely between the parts of yoke 2 and its periphery is always in position to engage the projecting end of 21, a spring catch or bolt, seated in yoke 2 and provided with retaining lugs 22, which project into slots 23 of said yoke 2.

The upper part of the two members of yoke 2 forms a clamp socket 24, as shown in Fig. 4, for the lower end of trolley pole 1. Extending into this end of trolley pole 1, when so seated, is the upper end of bolt 21, which is loosely connected with sleeve 25 by means of pin 26, securely fastened in bolt 21 and extending through slots 27 of sleeve 25. Spring 28, inclosed in sleeve 25 and provided with a bearing for its upper end as later explained, acts upon bolt 21, allowing said bolt to be pushed or pulled upward in sleeve 25 to the extent permitted by pin 22 in slots 23.

A compression spring 29 surrounds the stem of bolt 21 between seat 30 of socket 24 (shown sectionally and open in Fig. 4) in yoke 2 and the lower end of sleeve 25. At the upper end of sleeve 25 and inside of same screw threads are provided and into the socket thus formed is screwed the lower end of rod 31, the joint being made secure by means of a lock-nut 32. These parts are so made as to permit any necessary adjustment of the length of rod 31, as later explained. It will be seen that the lower end of rod 31, when so inserted in sleeve 25, provides a bearing for the upper end of compression spring 28. Sleeve 25 and rod 31, thus securely joined, are free to be moved longitudinally in trolley pole 1 by the action of spring 29 pressing against the lower end of sleeve 25, the amount of such motion being limited by pin 26 in slots 27 of sleeve 25 and by lugs 22 in slots 23 of yoke 2. The upper end of rod 31 extends somewhat beyond the end of trolley pole 1, the amount of said extension being capable of adjustment by means of the threaded connection of rod 31 and sleeve 25.

At the upper end of trolley pole 1 is provided a trolley wheel attachment consisting of a clamp-head 32, having internal lugs 33 seated in corresponding holes in trolley pole 1 to assist in making the connection of the pole and head perfect. A trolley wheel yoke 34 is hinged to head 32 by hinge pin 35, the hinge joint being preferably above the trolley pole, as shown. Lugs 36 on yoke 34 are arranged to engage lug 37 of head 32 and thus limit the swing of yoke 34 on its hinge pin 35. A trolley wheel 38 is mounted in yoke 34 by means of pin 39. Part 40 of yoke 34 engages the upper end of rod 31, as shown, and is made of suitable form to render such engagement as nearly frictionless as possible. Arm 41 of yoke 34 extends outward and downward from the part around pin 39 and is made with an eye 42 for attachment of resetting rope 43.

44 is the overhead power-supplying wire.

In normal operation trolley pulley 38 is held in yielding contact with overhead wire 44 by the action of erector spring 11 upon trolley pole 1 through connecting rod 10 and pin 17 engaging the upper part of slots 18 in yoke 2, the different parts occupying approximately the positions shown in Fig. 1. As long as normal operation continues, pin 17, which gives connecting rod 10 its hold on the trolley, is held at the upper part of slots 18 by means of toggle links 14 and 16, which are securely retained in their required relation to each other and to yoke 2 by ratchet tooth 20 on extension 19 of link 14, said ratchet tooth being then in engagement with bolt 21 and thereby prevented from allowing link 14 to escape. Bolt 21 and its sleeve 25, with rod 31 attached thereto, are securely held in their proper relation for engaging tooth 20 by means of the normal pressure of trolley wheel 38 under wire 44, the lower edge 40 of hinged yoke 34 engaging the upper end of rod 31 and preventing rod 31 and sleeve 25 from being forced upward by spring 29. In this normal relation, bolt 21 projects into the path of tooth 20 and is there retained by spring 28, pin 22 standing at or near the lower end of slots 23 in yoke 2.

Whenever trolley wheel 38 flies off from wire 44, or in any way escapes from the restraint thereof, yoke 34 and pulley 38 are instantly pushed upward and caused to swing on hinge pin 35 by the action of spring 29 upon sleeve 25, rod 31 and part 40 of yoke 34. As soon as sleeve 25 is thus allowed to move upward its impetus is increased by the action of spring 28 until the lower ends of slots 27 reach pin 26 in bolt 21. When this occurs, bolt 21 is forced upward with its sleeve 25, releasing ratchet tooth 20 and allowing the toggle joint formed by links 14 and 16 to collapse under the powerful action of erector spring 11. Simultaneously with the collapse of the toggle joint, shiftable pin 17 and the head of connecting rod 10 are forced to the lower part of slots 18, thus quickly and sharply releasing the tension of erector spring 11. So prompt and effective is this release of tension that its action is fully accomplished before spring 11 has time to overcome the inertia of trolley pole 1 and its attachments or cause any upward appreciable movement thereof. On the contrary, the tension of erector spring 11 having been instantly released in the manner just described, trolley pole 1 and its attachments are left unsupported and swing downward at once on hinge pin 6 until caught by pin 17 and rod 10 when said rod 10 has been drawn back by the weight of the falling trolley enough to restore supporting tension to spring 11. The position of the different parts after this release of the tension of erector spring 11 and consequent dropping of trolley pole 1 is shown in Fig. 2, the trolley pole being sufficiently lowered to avoid striking overhead wire 44 or any of its attachments.

It will be understood that the tension of spring 11 may be adjusted by means of locknuts 13 so as to meet the requirements of the differing positions of the trolley, the spring itself being of suitable size and sufficient resiliency to be so adjusted. It should be noted further, at this point, that the lifting or supporting power of erector spring 11, as far as its effective action upon the trolley is concerned, is very materially reduced by the shifting of application to yoke 2 from the upper to the lower part of slots 18, the power being then applied so much nearer the fulcrum at hinge pin 6. It should also be especially noted that sleeve 25 and rod 31, before disturbing bolt 21, must move upward a distance controlled by the relation of slots 27 to pin 26. This preliminary motion of rod 31 and sleeve 25, without affecting bolt 21, serves two important purposes. It permits a considerable vibration of the trolley pole without breaking the contact of pulley 38 with wire 44 and it prevents premature release of ratchet tooth 20, which otherwise might occur.

The shifting of the point of application to yoke 2 of the action of erector spring 11 is greatly assisted and is given most complete efficiency by the use of my improved method of mounting the erector spring. The trunnioned washer 8, mounted on posts 7, with connecting rod 10 passing through it, permits rod 10 to change its position as required and at the same time maintains its axial alinement with spring 11. The advantage of this is readily understood, the natural line of application of the power of spring 11 being, by this means, constantly utilized. My trunnioned mounting of rod 10 and spring 11 prevents the loss of power from unavoidable friction which would result from mounting the erector spring on a rigid strut as has been the common practice.

It now remains to explain the manner of restoring the parts to their normal operative positions and relations. This is accomplished by pulling down on resetting rope 43, the first result of which is to cause part 40 of yoke 34 to engage with the upper end of rod 31 and force said rod and attached sleeve 25 downward, restoring bolt 21 to position for engagement with ratchet tooth 20. Continued downward pulling of rope 43 brings trolley pole 1 to an approximately horizontal position, as shown in Fig. 3. During this downward swing of trolley pole 1, toggle link 14 being firmly supported by resting on base plate 3, and yoke 2 carrying pin 17 forward and downward, toggle links 16 force pin 17 along slots 18 permitting knuckle joint 15 to come nearer and nearer to the plane of the axes of pins 6 and 17. The combined motion of yoke 2 and pin 17 draws out connecting rod 10 compressing spring 11. At the same time extension 19 of link 14 remains stationary while yoke 2 in its downward course causes bolt 21 to engage the periphery of 19 and be gradually forced back against spring 28 until bolt 21 passes ratchet tooth 20 when it is instantly thrown out by spring 28 and prevents any return movement of ratchet tooth 20 or of any of the toggle joint parts. Erector spring 11 can then be permitted to raise trolley pole 1 and its attachments to operative position by gradually releasing rope 43 and guiding trolley wheel 38 to its proper engagement with wire 44, as in Fig. 1. Rope 43 is then allowed to hang loosely enough to permit all necessary lateral motion of the trolley when the vehicle passes around curves.

Having now fully described my trolley pole controlling device, its preferable manner of construction, its mode of operation and its advantages, what I claim as my invention and desire to secure by Letters Patent, is—

1. In a trolley pole controlling device, an erector spring, a support for sustaining the tension of said spring consisting of a toggle joint one member of which is extended beyond the knuckle of the toggle and forms a lever for supporting the weight at said knuckle caused by the tension of said erector spring; and means for retaining said supporting lever in its operative relation.

2. In a trolley pole controlling device, an erector spring, and a support for sustaining the tension of said spring consisting of a toggle joint one member of which is extending beyond the knuckle of the toggle and forms a lever for supporting the weight at said knuckle caused by the tension of said erector spring; and, in combination with said supporting lever, means controlled by the trolley wheel for retaining said lever in its toggle supporting position.

3. In a trolley pole controlling device an erector spring and a support for sustaining the tension of said spring consisting of a toggle joint one member of which is extended beyond the knuckle of the toggle and forms a lever for supporting the weight at said knuckle caused by the tension of said erector spring; and, in combination with said supporting lever, means controlled by the trolley wheel for retaining said lever in its toggle supporting position, and means, allowed to operate by escape of the trolley wheel from its power supplying wire, for releasing said lever and permitting collapse of the tension supporting toggle.

4. In a trolley pole controlling device, a hinged pole, an erector spring, a pin coupling the spring to the pole at a variable distance from the pole hinge and a support for sustaining the tension of said erector spring and for permitting the release of same; the said support consisting of a toggle joint in combination with and connecting the pole hinge and the coupling pin, said coupling pin being limitedly movable longitudinally of said pole and adapted to have its motion controlled by the toggle joint and the erector spring.

5. In a trolley pole controlling device, a support for sustaining the tension of the erector spring and for permitting the release of same, the said support consisting of a toggle joint in combination with the pole, the pole hinge, the erector spring, a retaining bolt in the pole and a coupling pin which forms the attachment of the erector spring to the trolley pole, said coupling pin being capable of limited motion longitudinally of said pole and of having its distance from the pole hinge controlled by the toggle joint and the erector spring; one member of said toggle connecting with said movable coupling pin and the other toggle member connecting the pole hinge with the knuckle pin of the toggle and being extended beyond said knuckle pin, forming a lever capable of being caught and held by the retaining bolt and of thus holding said movable coupling pin at the distance from the pole hinge necessary for operative tension of the spring.

6. In a trolley pole controlling device, a support for sustaining the tension of the erector spring and for permitting the release of same, the said support consisting of a toggle joint in combination with the pole, the pole hinge, the erector spring, a retaining bolt in the pole, means for releasing said retaining bolt, and a coupling pin which form the attachment of the erector spring to the trolley pole; said coupling pin being capable of limited motion longitudinally of said pole and of having its distance from the pole hinge controlled by the toggle joint and the erector spring; one member of said toggle connecting with the said movable coupling pin and the other toggle member connecting the said pole hinge with the knuckle pin of the toggle and extending beyond said knuckle pin, forming a lever adapted to engage with said retaining bolt and thus support the toggle in approximately complete extension, but limiting said extension by preventing the knuckle pin from reaching the dead center, the toggle joint being thus left free to collapse whenever said supporting lever is released.

7. A hinged trolley pole having an erector spring provided with means for applying its lifting power at a greater or a less distance from the hinge of said pole, said application at the greater distance being caused by the approximately complete extension of a toggle, and said application at the less distance resulting from the collapse of said toggle; in combination with a toggle-joint one member of which is extended beyond the knuckle pin of the toggle forming a lever adapted to sustain said toggle in the aforesaid extension, and means for retaining said lever in its toggle sustaining relation.

8. A hinged trolley pole, a supporting spring, a toggle joint one member of which forms a lever for sustaining approximately complete extension of the toggle, means for setting and retaining said lever in its extension sustaining position, means whereby said toggle extension causes and maintains the application of the supporting power of said spring at a determined distance from the hinge of said pole, and means for permitting partial collapse of the toggle and instant reduction of said distance of application by the release of said lever.

9. A hinged trolley pole, a supporting spring for same, a toggle adapted by its approximately complete extension to sustain the connection of said spring to said pole at a distance from the pole hinge sufficient to produce and maintain operative elevation of said pole, means for retaining said toggle in its approximately completely extended position as long as normal contact of the trolley with an overhead power-supplying wire continues; said retaining means operating through a lever formed by the prolongation of one member of the toggle; and means operating automatically and instantly when said contact is lost whereby said toggle is released and the distance of said spring connection from the pole hinge is reduced.

10. A hinged trolley pole, a spring bolt in said pole, an erector spring, means for applying the lifting power of said erector spring to said pole at a greater or a less distance from the hinge of said pole, and means for setting and maintaining same at said greater distance of application; said setting and maintaining means consisting of a toggle one member of which forms a lever for supporting said toggle in approximately complete extension by engaging with the said spring bolt in the trolley pole.

11. A hinged trolley pole and an erector spring normally supporting said pole at operative elevation by the application of its lifting power at a determined distance from the pole hinge in combination with a toggle adapted, by its approximately complete extension, to determine and maintain said distance of application, means for maintaining the extension of said toggle through a lever formed by the prolongation of one of the toggle members beyond the knuckle pin and means for retaining said lever in its extension maintaining position.

12. A hinged trolley pole, a supporting spring, a toggle joint adapted to sustain the point of connection of said spring to said pole at a point between the pole hinge and the trolley wheel and at a determined distance from said hinge, and to permit said point of connection to be drawn nearer said hinge when not so sustained, the said toggle joint having one of its members extended beyond the knuckle of the toggle, forming a lever for supporting said toggle, and, in combination with said spring and toggle, means controlled by the trolley wheel for retaining said lever in its toggle supporting position.

13. In a trolley pole controlling device, the combination with a trolley wheel bracket, capable of upward motion independently of the trolley pole when not retained by contact of the wheel with the power supplying wire, of an erector spring, a pin coupling said spring to the trolley pole at a variable distance from the pole hinge, a toggle-jointed support for sustaining the tension of said spring, said toggle joint comprising a pair of members connecting the knuckle joint of the toggle with said coupling pin, and a single member connecting said knuckle joint with the hinge of said pole, said single member being extended beyond the knuckle joint and forming a lever adapted to support said coupling pin at a determined distance from the pole hinge, and means for sustaining said supporting lever.

14. In a trolley pole controlling device, the combination with a trolley pole and a trolley wheel bracket mounted thereon, said bracket being capable of upward motion independently of the trolley pole when not restrained by contact of the wheel with the power supplying wire, of an erector spring, a pin coupling said spring to the trolley pole at a variable distance from the pole hinge, a toggle-jointed support for sustaining the tension of the erector spring, said toggle joint comprising a pair of members connecting the knuckle joint of the toggle with said coupling pin and a single member connecting said knuckle joint with the pole hinge, said single member being extended beyond the knuckle joint and forming a lever adapted to support said coupling pin at a determined distance from the pole hinge by supporting the toggle joint in somewhat less than complete extension; and means, controlled by said trolley wheel bracket, for retaining said supporting lever, toggle joint and coupling pin in their operative relation as long as the trolley wheel maintains its contact with the power supplying wire; together with means for permitting the release of said lever and the consequent collapse of the toggle-jointed spring tension support whenever said trolley wheel loses said contact.

In testimony whereof I have hereunto set my hand, in the presence of two witnesses this 12th day of May A. D. 1915.

EDWARD ALBERT COLTON.

Witnesses:
OCTAVIUS J. COLTON,
ALICE L. COLTON.

Copies of this patent may be obtained for five cents each, by addressing the "Commissioner of Patents, Washington, D. C."